United States Patent
Sumiyoshi et al.

[15] 3,689,120
[45] Sept. 5, 1972

[54] ANTI-SKID BRAKING SYSTEMS

[72] Inventors: Masaharu Sumiyoshi, 2-48, Ima-cho, Toyota-shi, Aichi-ken; Akira Suzuki, 2-5, Rokujizo, Noda, Kariya-shi; Minoru Kawabata, 2-125, Yashiki, Ogawa, Higashiura-cho, Chita-gun; Shizuki Sakurai, 1-18, Mitsurugi-cho, Mizuho-ku, Nagoya-shi, all of Japan

[22] Filed: July 28, 1970

[21] Appl. No.: 58,958

[30] Foreign Application Priority Data

Aug. 12, 1969    Japan.....................44/64086

[52] U.S. Cl..........303/21 A, 188/181 T, 303/21 CH, 303/21 F
[51] Int. Cl..............................................B60t 8/12
[58] Field of Search....188/181; 244/111; 303/20, 21

[56] References Cited

UNITED STATES PATENTS

| | | |
|---|---|---|
| 3,362,757 | 1/1968 | Marcheron...............303/21 P |
| 3,235,036 | 2/1966 | Meyer et al...........303/21 P X |
| 2,992,860 | 7/1961 | Hirzel....................244/111 X |
| 3,532,393 | 10/1970 | Riordan.................303/21 BE |
| 3,512,844 | 5/1970 | Stelzer......................303/21 F |
| 3,469,662 | 9/1969 | Dewar...............303/21 CG X |
| 3,490,566 | 1/1970 | Von Keszycki.......303/21 CH |
| 3,369,845 | 2/1968 | Leonard....................303/21 F |
| 3,495,881 | 2/1970 | Harned et al.............303/21 F |

*Primary Examiner*—Milton Buchler
*Assistant Examiner*—Stephen G. Kunin
*Attorney*—Berman, Davidson and Berman

[57] ABSTRACT

An anti-skid braking system which serves to modulate the pressure in the wheel brake cylinders of a vehicle to prevent the vehicle wheels from being locked when the normal proportional relationship between brake torque and wheel deceleration is no longer present. In order to modulate the pressure in the wheel brake cylinders, a pressure modulating valve is provided between the master cylinder and each wheel brake cylinder, the pressure modulating valve being responsive to a signal derived from a comparator circuit. The comparator circuit compares a signal responsive to brake torque and derived from a brake torque sensor, with a signal responsive to wheel deceleration and derived from a wheel deceleration operational circuit, to derive the first-named signal. The wheel deceleration operational circuit is adapted to convert a signal responsive to wheel speed and derived from a wheel speed sensor into said wheel deceleration-responsive signal. Preferably, both the comparator circuit and the wheel deceleration operational circuit are composed of fluid amplifier devices.

34 Claims, 12 Drawing Figures

PATENTED SEP 5 1972

INVENTORS.
MASAHARU SUMIYOSHI,
AKIRA SUZUKI,
MINORU KAWABATA,
SHIZUKI SAKURAI,

BY
Berman, Davidson & Berman,
ATTORNEYS

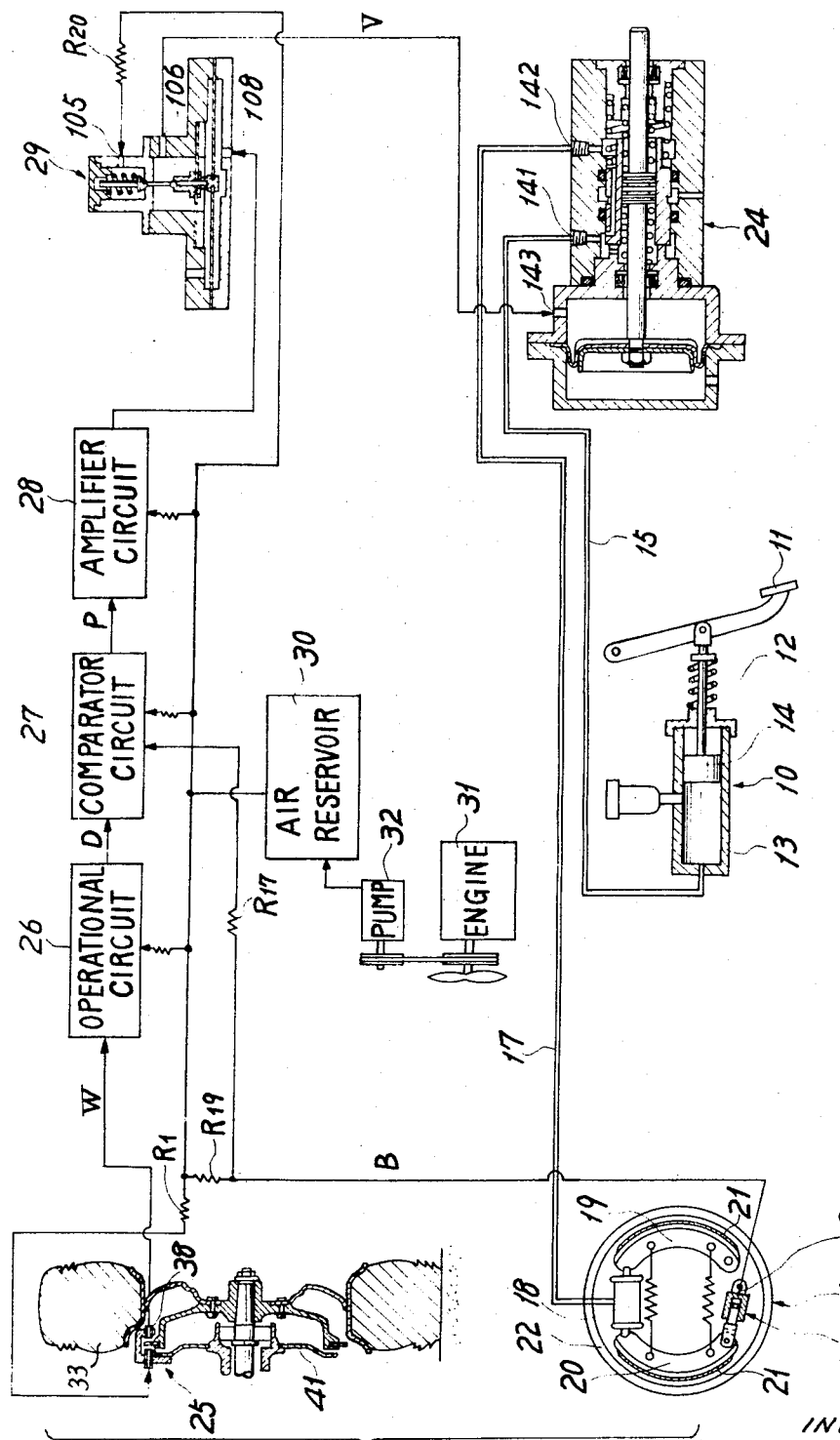

INVENTORS,
MASAHARU SUMIYOSHI,
AKIRA SUZUKI,
MINORU KAWABATA,
SHIZUKI SAKURAI,

BY
Berman, Davidson & Berman
ATTORNEYS

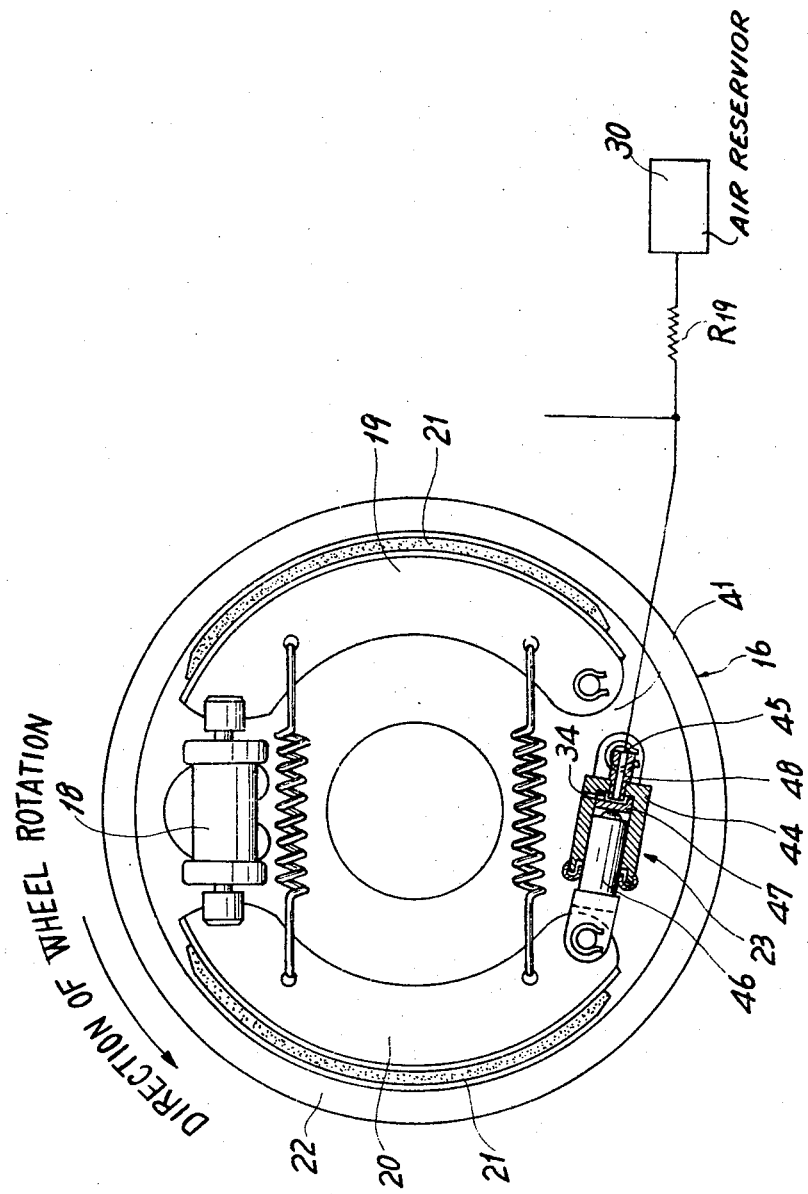

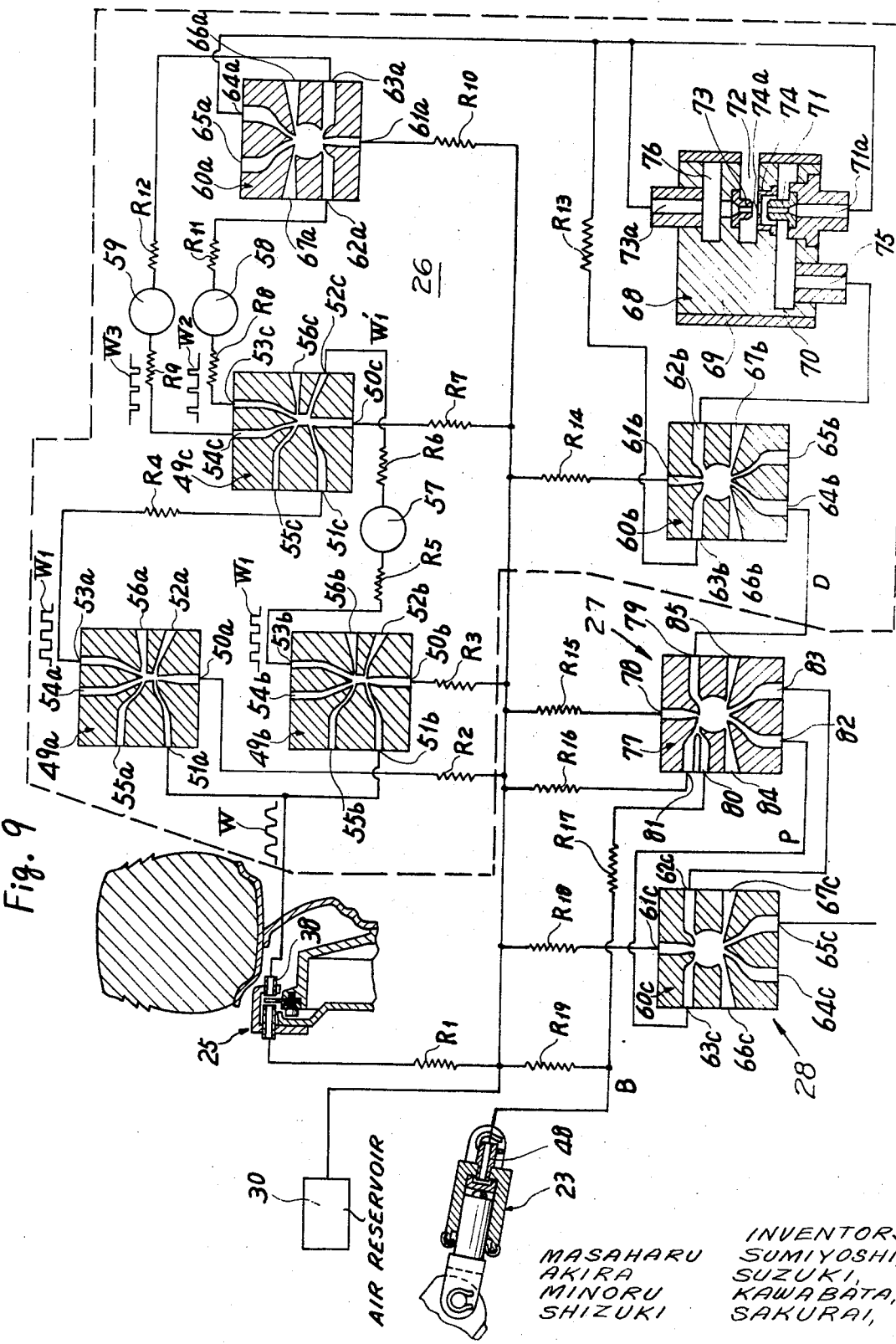

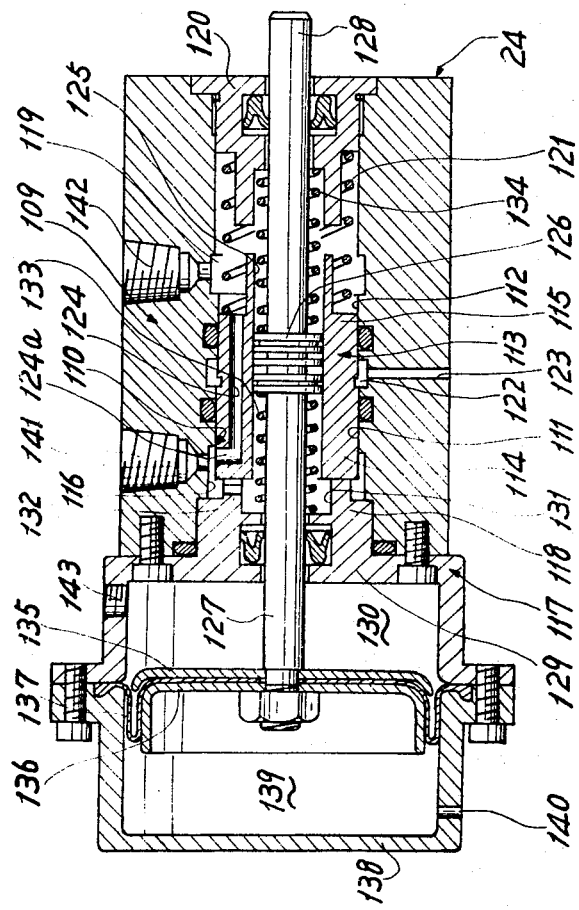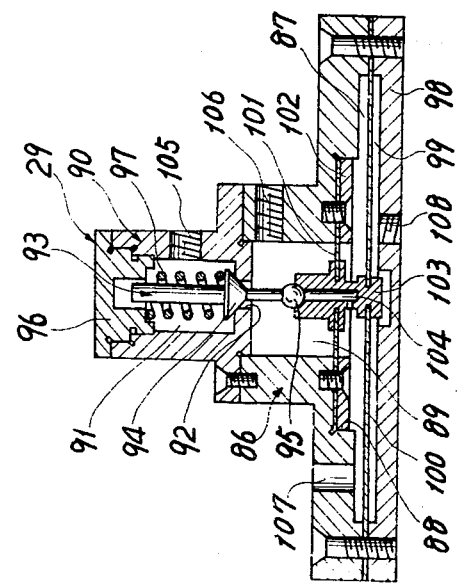

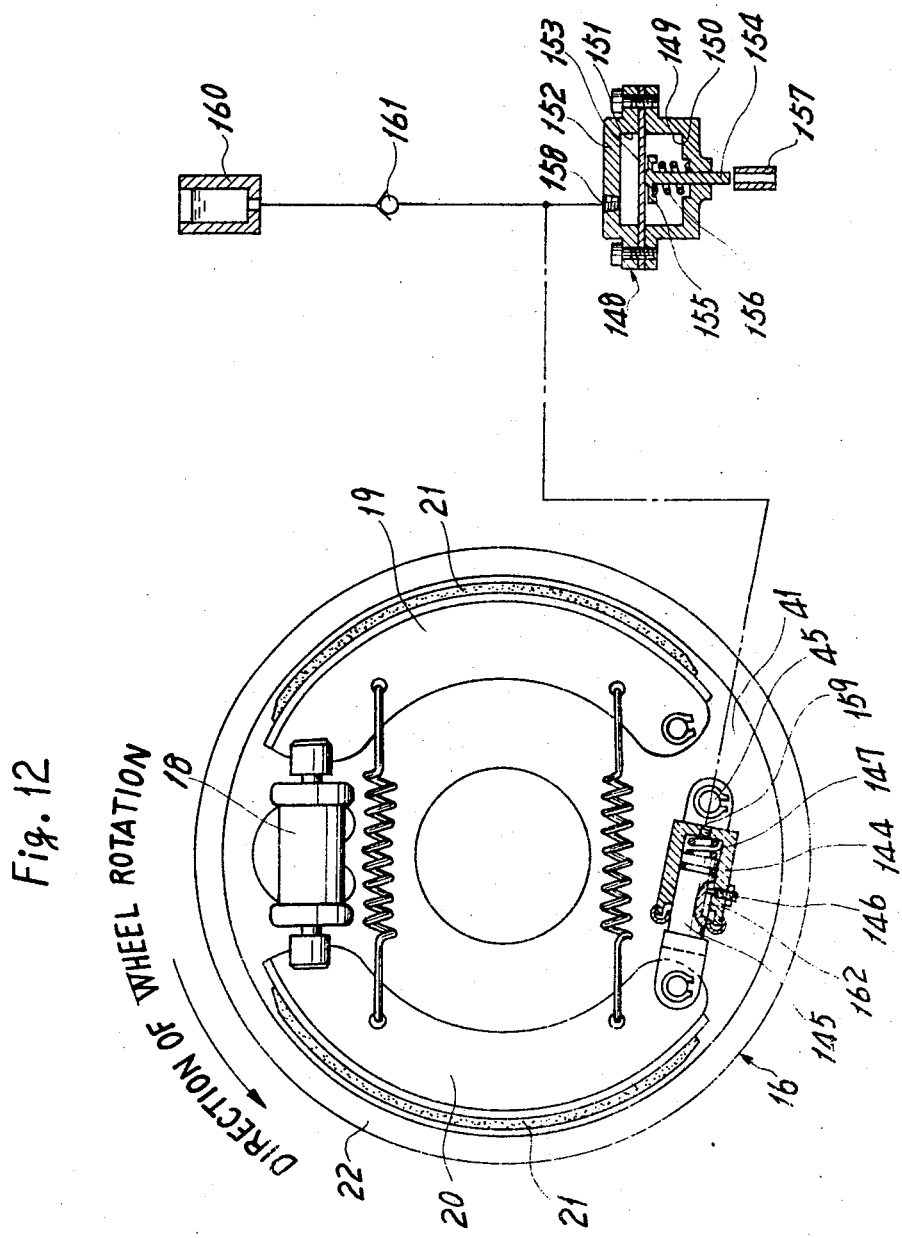

ANTI-SKID BRAKING SYSTEMS

BACKGROUND OF THE INVENTION

This invention relates to an anti-skid braking system which prevents the wheels of a vehicle from becoming locked during braking and causing the vehicle to skid.

Up to the present time conventional anti-skid braking systems have employed means to release the braking force when a wheel becomes completely locked, by measuring the number of wheel revolutions while the vehicle is undergoing deceleration. However, in any conventional system, the wheel has a tendency to be locked positively, even though for a very short duration, and there is no assurance of maintaining adequate steerability and directional stability of the vehicle. Moreover, such conventional systems have been proven unable to obtain the desired result of shortening the braking distance.

SUMMARY OF THE INVENTION

It is therefore an object of the present invention to provide an improved anti-skid braking system which avoids the above-mentioned disadvantages of conventional anti-skid braking systems.

Another object of the present invention is to provide an anti-skid braking system which is extremely reliable and wherein the slip ratio between the tire and the roadway is controlled so as to always maintain substantially the maximum frictional coefficient therebetween during rapid braking, and wherein the shortest braking distance is provided for the vehicle.

Another object of the present invention is to provide an anti-skid braking system wherein brake torque is modulated when the normal proportional relationship between brake torque and wheel deceleration is no longer present, the modulation being obtained by comparing brake torque and wheel deceleration.

A still further object of the invention is to provide an improved anti-skid braking system which employs fluid amplifier devices free from troubles heretofore encountered with devices employing moving parts and free from difficulties arising under high temperature conditions.

DESCRIPTION OF THE DRAWINGS

The foregoing and other objects of the present invention will become fully apparent from the following description of a preferred embodiment of the invention, with reference to the accompanying drawings, wherein:

FIG. 5 is a diagrammatic illustration showing a control circuit as employed in a preferred embodiment of the present invention.

FIG. 8 is a cross-sectional view taken through a portion of a wheel brake assembly showing a brake torque sensor, according to the present invention, mounted on one of the brake shoes.

FIG. 9 is a schematic view with parts in cross-section of portions of the system of FIG. 5, showing a wheel deceleration operational circuit, a comparator circuit, and an amplifier circuit, wherein fluid amplifier devices are employed.

FIG. 10 is a cross-sectional view of a servo valve for amplifying the air signal pressure from the control circuit of FIG. 5.

FIG. 11 is a large cross-sectional view of the pressure-modulating valve for modulating the pressure in the wheel brake signal according to the air signal delevered from the servo valve in the system of FIG. 5.

FIG. 12 is a view similar to FIG. 8 but showing another embodiment of a brake torque sensor according to the present invention.

DETAILED DESCRIPTION OF THE INVENTION

Before describing a preferred embodiment of the present invention, reference will be made to FIGS. 1 to 4 in connection with which a typical braking procedure will be discussed from a theoretical standpoint. Thus, referring to FIG. 1, when the vehicle is braked, the following relationships are obtained:

By equating the horizontally acting forces with respect to the wheel, the following equation is obtained:

$$\mu W = -\frac{W}{g}\frac{dv}{dt} \qquad (1)$$

Furthermore, by equating the moments around the axis of the wheel, the following further equation is obtained:

$$TB = -\frac{I}{r}\frac{dv}{dt} + \mu W r \qquad (2)$$

where
$V$ = vehicle speed
$v$ = wheel speed
$I$ = moment of inertia of the wheel
$r$ = effective radius of the wheel
$W$ = vehicle load
$\mu$ = frictional coefficient between tire and road
$t$ = time elapsed after the start of braking
$TB$ = brake torque In the ensuing discussion the subscript $n$ for $V$ or $v$ will designate a particular speed at a particular time after start of braking.

Figure 3:
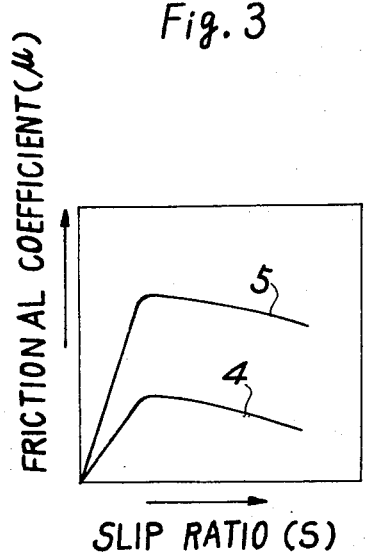
FIG. 3 is a graph showing the relationship between the slip ratio and the frictional coefficient between a tire and road surface under different road conditions.

Referring to FIG. 3, as is well known, the frictional coefficient $\mu$ is influenced by the slip ratio S which is defined by the following relationship:

Slip ratio $S = (V - v/V)$

The frictional coefficient $\mu$ has the characteristic of increasing in magnitude in proportion to the increase in the value of Slip ratio $S$ until the $S$ value reaches a magnitude of between 0.15 to 0.20, and thereafter decreasing, which results in wheel locking. This relationship can be mathematically expressed by stating that the function $\mu$ equals $f(S)$.

As the above two differential Equations (1) and (2) cannot be solved in their present form, the following approximate equations may be set up, considering events at time $n$ to take place in a small increment of time $\Delta t$:

$$V_{n+1} = -g \cdot \mu_n \cdot \Delta t + V_n$$
$$v_{n+1} = \frac{r}{I}(Wr\mu_n \cdot \Delta t - TB_n \cdot \Delta t) + v_n$$
$$S_n = \frac{V_n - v_n}{V_n}$$
$$H_n = f(S_n)$$

In the above equations the letter $g$ represents the value of the gravitational constant. Substituting the value of $V_0 = v_0$ under starting conditions, the function $TB_n = a \cdot t$, where $a$ is a proportional constant, and $\mu$ equals $f(S)$ into the above four equations, there may be obtained the relationship between brake torque $TB_n$ and wheel deceleration, $$\frac{v_{n+1} - v_n}{\Delta t} = \frac{-\Delta v}{\Delta t} = \frac{r}{I}(TB_n - W \cdot r \cdot \mu_n)$$

Figure 1:
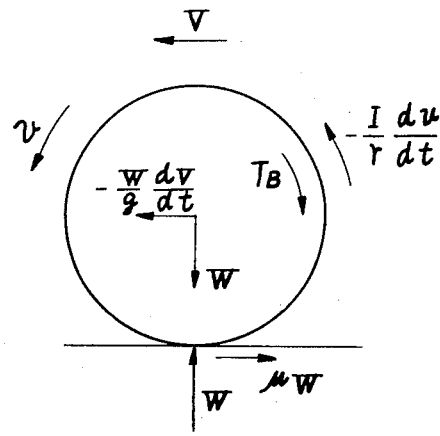
FIG. 1 is a diagrammatic view showing the forces which act upon a wheel during braking.
Figure 2:
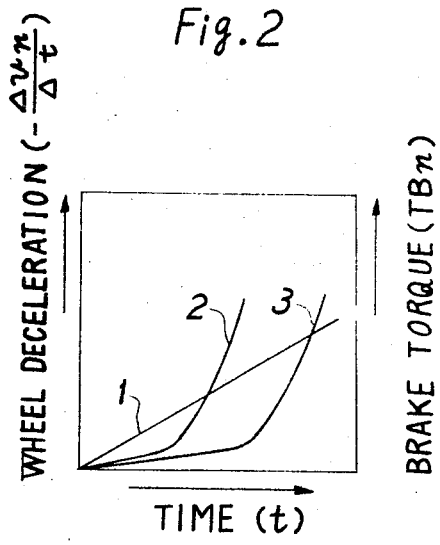
FIG. 2 is a graph showing the relation between brake torque and wheel deceleration with respect to time.

The above equation expresses the events occurring for each interval of time $\Delta t$, and the relationship between wheel deceleration and brake torque with respect to time is plotted in FIG. 2. In FIG. 2, the line 1 shows the change in brake torque $TB_n$ with time, and the curves 2 and 3 show the change in wheel deceleration $-\Delta v_n/\Delta t$, which is calculated by evaluating the function $\mu = f(S)$, from the curves 4 and 5 of FIG. 3 under different road conditions.

It will be apparent from FIG. 2 that while the frictional coefficient $\mu$ is increasing in proportion to the slip ratio S, both brake torque $TB_n$ and wheel deceleration $-\Delta v_n/\Delta t$, increase linearly with the lapse of time after the start of braking, and therefore the brake torque $TB_n$ is proportional to wheel deceleration $-\Delta v_n/\Delta t$ during the period where the frictional coefficient $\mu$ is increasing. In this case, the ratio of the brake torque $TB_n$ to wheel deceleration $-\Delta v_n/\Delta t$ is approximately constant even when the relationship between frictional coefficient $\mu$ and the slip ratio S is derived from either curve 4 or curve 5 of FIG. 3 as long as the brake torque $TB_n$ remains proportional to wheel deceleration $-\Delta v_n/\Delta t$. In other words, the ratio thus expressed is approximately constant independently of the road condition. However, when the frictional coefficient $\mu$ decreases, in accordance with an increase in the slip ratio S, resulting in a tendency for wheel lock, the above-described proportional relationship between brake torque $TB_n$ and wheel deceleration $-\Delta v_n/\Delta t$ is substantially absent.

Figure 4:
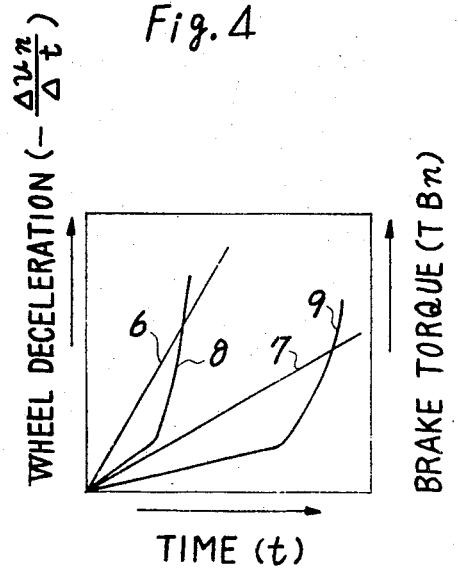
FIG. 4 is a graph showing the relationship among brake torque, wheel deceleration, and time under different conditions of brake torque.

FIG. 4 shows the values of brake torque $TB_n$ and wheel deceleration $-\Delta v_n/\Delta t$, respectively, as they vary with time, with different values of the aforementioned proportional constant $a$, under the same road condition. In FIG. 4, lines 6 and 7 show the variation of brake torque $TB_n$ when said proportional constant has the values $a_1$ and $a_2$, respectively, and the curves 8 and 9 show the variation of wheel deceleration $-\Delta v_n/\Delta t$ with time, in association with respective brake torques $TB_n$ represented by the lines 6 and 7.

In these circumstances, regardless of the use of either the proportional constant $a_1$ or $a_2$, the relationship between the slip ratio S and the frictional coefficient $\mu$ is equal because of the existence of the same road condition.

It is evident from FIG. 4 that the proportional relationship between brake torque $TB_n$ and wheel deceleration, $-\Delta v_n/\Delta t$, is substantially constant irrespective of the magnitude or degree of application of brake torque until the breakdown of this relationship takes place.

It will therefore be apparent that by either decreasing the pressure in the wheel brake cylinder or by decreasing the brake torque when deterioration of the proportional relationship between brake torque and wheel deceleration occurs, it is possible to effectively prevent the associated wheel from locking.

In providing an anti-skid braking system according to the present invention, an electrical system, a pneumatic system, or the like may be utilized. However, the following description is concerned with a preferred embodiment of the present invention utilizing a pneumatic system, and in particular, a system employing fluid amplifier devices.

Referring to FIG. 5 which schematically illustrates an anti-skid braking system in accordance with the present invention, the numeral 10 designates a conventional brake-actuating assembly having a brake pedal 11. When the pedal 11 is depressed against the force of a coil biasing spring 12, fluid under pressure is transmitted to a conduit 15 by a piston 14 slidably mounted in the master cylinder 13, the piston being connected to the pedal 11. The numeral 16 generally designates a wheel brake assembly of the internal expanding type, associated with a vehicle wheel 33. When fluid under pressure is supplied to the wheel brake cylinder 18 through a conduit 17, a pair of pivoted shoes 19 and 20 mounted on a backing plate 41 are rotated outwardly so as to bring their brake linings 21, 21 into frictional contact with a brake drum 22, whereby brake torque is applied to wheel 33 which rotates as a unit with the brake drum 22.

A brake torque sensor 23, presently to be described, is connected between the shoe 20 and the backing plate 41. Said sensor 23 is designed to deliver an air signal (B), whose pressure is in proportion to the developed brake torque.

The reference numeral 24 generally designates a pressure modulating valve, presently to be described in detail. To describe the pressure modulating valve 24 in brief, it is connected with the master cylinder 13 through the conduit 15 and also with the wheel brake cylinder 18 through the conduit 17.

When fluid under pressure is supplied from the master cylinder 13 to the wheel brake cylinder 18, and the pressure in the wheel brake cylinder 18 becomes higher than a predetermined value, fluid communication between the wheel brake cylinder 18 and the master cylinder 13 is cut off, and fluid under pressure is trapped in the wheel cylinder 18. Under this enclosed condition, when an air signal (V) from a servo valve 29, presently to be described, flows into the pressure modulating valve 24, the pressure in the wheel brake cylinder 18 is decreased in proportion to the pressure of the air signal (V).

Numeral 25 generally designates a wheel speed sensor, presently to be described in detail, which derives an air pulse signal (W) the frequency of which is in proportion to wheel rotational speed. Said air pulse signal (W) is differentiated in a wheel deceleration operational circuit 26, thereby converting it into an air signal (D) whose pressure is in proportion to wheel deceleration. Said air signal (D) is compared in a comparator circuit 27 with the air signal (B) whose pressure is proportional to brake torque. An output air signal (P) is derived from the comparator circuit 27, whose pressure is proportional to the pressure difference between said air signals (D) and (B) when the normal proportional relationship between brake torque and wheel deceleration is no longer present. The air signal (P) is amplified in an amplifier circuit 28, and is then sent to a servo valve 29 to be further amplified and to be delivered therefrom as the air signal (V). The amplified air signal (V) is then sent to the pressure modulating valve 24.

Numeral 30 designates an air reservoir for storing, under constant pressure, the compressed air furnished from an air pump 32 driven by the vehicle engine 31. Said stored compressed air is applied to the brake torque sensor 23, the wheel speed sensor 25, the wheel deceleration operational circuit 26, the comparator circuit 27, the amplifier circuit 28, and the servo valve 29.

Figure 7:
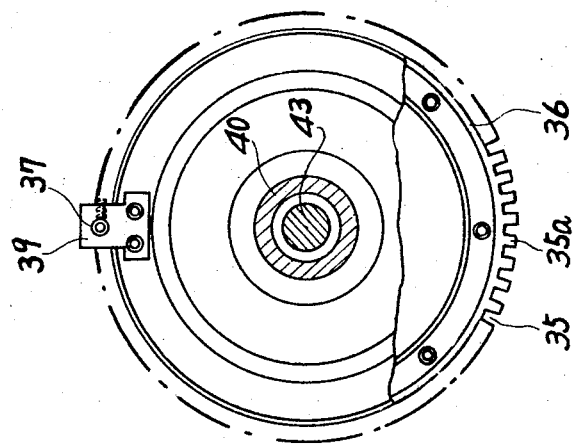
FIG. 7 is a side view taken in a direction indicated by the arrow VII of FIG. 6.
Figure 6:
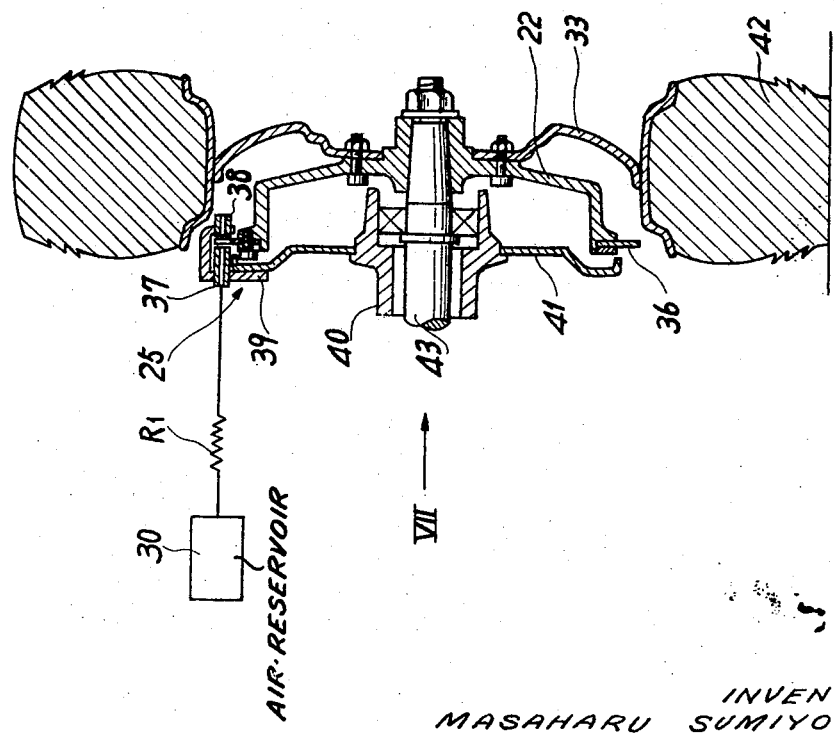
FIG. 6 is transverse crosssectional view taken through a wheel employing a wheel rotational speed sensor, in accordance with the present invention.

Referring to FIGS. 6 and 7, the wheel speed sensor assembly 25 will be described in detail. A rotating disc 36 having equally spaced rectangular notches 35 and teeth 35a extending continuously on the periphery thereof is secured on the brake drum 22, which is rigidly secured to the wheel 33. A supply nozzle 37 and a receiver nozzle 38 are mounted on opposite sides of the notched periphery of the rotating disc 36, being secured to the backing plate 41 by a fixture 39, the backing plate being centrally secured to the fixed axle housing 40. The supply nozzle 27 and the receiver nozzle 38 are axially aligned but are oppositely positioned with respect to each other. The supply nozzle 37 is connected to the air reservoir 30 through a suitable restriction $R_1$ and discharges compressed air under constant pressure. Numeral 42 designates the associated tire, and numeral 43 designates the associated axle shaft, these elements being rotatably connected with the vehicle frame by conventional means (not shown). The restriction $R_1$ and the restrictions $R_2$ through $R_{20}$, which will be subsequently mentioned, all comprise calibrated orifices.

When the wheel 33 rotates, if one of the notches 35 on the rotating disc 36 registers with the supply nozzle 37 and the receiver nozzle 38, the compressed air from the air reservoir 30 blows into the receiver nozzle 38 continuously, and therefore, the pressure in the receiver nozzle 38 will increase. On the other hand, when one of the teeth 35a of the rotating disc 36 registers with the supply nozzle 37 and the receiver nozzle 38, the flow of compressed air is interrupted by said one of the teeth 35a, and therefore the compressed air will not blow into the receiver nozzle 38, so that the pressure in the receiver nozzle 38 will consequently decrease. Therefore, the pressure in the receiver nozzle 38 will rise and fall alternately in accordance with wheel rotation, and thus the air pulse signal (W) will be generated in the receiver nozzle 38, the frequency of said air pulse (W) being in proportion to wheel speed.

The rotating disc 36 may be secured on the vehicle propeller shaft which transmits the rotational force to the driven wheels instead of on the wheel 33, so that the air pulse signal (W) may be derived in accordance with the driven wheel rotating speed.

Referring now to FIG. 8, the brake torque sensor assembly 23 will be described in detail. Numeral 44 designates a cylinder pivotally mounted on the backing plate 41 by an anchor pin 45. One end portion of a piston 46 is slidably mounted in the cylinder 44 and the opposite end portion thereof is pivotally connected to the shoe 20. Piston 46 can be pivotally connected to either shoe 19 or shoe 20. However, it is preferable to connect the piston 46 to the shoe 20 in a manner such that is will respond to the tangential reaction of brake force.

A cup-shaped flexible member 47, opening inward, namely, toward the end wall of cylinder 44, is located adjacent said end wall. A supply nozzle 48 is connected to the air reservoir 30 through a suitable restriction $R_{19}$ and extended centrally through the end wall cylinder 44, projecting into the recess of the cup-shaped member 47 with a small amount of clearance with respect thereto. A vent port 34 is provided in the side wall of cylinder 44 adjacent the end wall thereof and communicates with a registering port in the skirt portion of the flexible member 47, thereby defining a continuous passage including the port 34 having one end open to atmosphere and the other end communicating with the interior of the flexible member 47. Therefore, air from the supply nozzle 48 can be vented to atmosphere through the vent port 34.

When shoe 20 is rotated outwardly and is thrust against the brake drum 22 by the action of the wheel brake cylinder 18 during braking, braking force will be developed on the brake drum 22. As a result of the tangential component of said braking force, the brake shoe 20 is driven by the brake drum 22 in the direction of wheel rotation. The piston 46 has a rounded end abutment element which is engageable with the center portion of the cup-shaped flexible member 47. Thus, the piston 46 receives axial thrust force from the brake shoe 20 to engage and distort the flexible member 47 inwardly, which tends to reduce the clearance between the inner recess of the flexible member 47 and the inwardly projecting end supply nozzle 48. As the clearance between the inner recess of the flexible member 47 and the adjacent open end of the supply nozzle 48 is decreased, the pressure in the supply nozzle 48 increases. Unless the associated wheel suddenly slips against the road surface, that is, unless the proportional relationship between brake torque and wheel deceleration is no longer present, the pressure in the supply nozzle 48 is in proportion to brake torque, since said brake torque and the thrust force of piston 46 have approximately a proportional relationship.

FIG. 9 diagrammatically illustrates the wheel deceleration operational circuit 26, the comparator circuit 27, the amplifier circuit 28 and the fluid line interconnections associating these circuits with other parts of the system. Reference numerals 49a, 49b, and 49c designate monostable fluid amplifier devices which have input nozzles 50a, 50b, and 50c, which have pairs of control nozzles 51a – 52a, 51b – 52b, and 51c – 52c, which have pairs of output nozzles 53a – 54a, 53b – 54b, and 53c – 54c, and which have pairs of vent nozzles 55a – 56a, 55b – 56b, and 55c – 56c. When a normal air signal enters the control nozzles 51a, 51b, and 51c, the compressed air from input nozzles 50a, 50b and 50c flows out through the output nozzles 53a, 53b and 53c, and delivers the resultant air signals at these nozzles. But, if an input air signal is not present at the control nozzles 51a, 51b and 51c, and consequently, if the air signals at the control nozzles 51a, 51b and 51c, and at 52a, 52b and 52c are of equal pressure, the compressed air from input nozzles 50a, 50b and 50c flows out through the output nozzles 54a, 54b, and 54c. The input nozzles 50a and 50b of the monostable fluid amplifier devices 49a and 49b are connected to the air reservoir 30 through suitable restrictions $R_2$ and $R_3$, respectively, and the control nozzles 51a and 51b are connected to the receiver nozzle 38 of the wheel speed sensor assembly 25. Therefore, the air signal W from the wheel speed sensor assembly 25 is shaped so as to comprise periodically recurring fine rectangular pulses, namely, so as to have a fine substantially rectangular wave form, by the fluid amplifier devices 49a and 49b and these signals discharge from the output nozzles 53a and 54b as the square wave air signals $W_1$ having the same frequency as that of the air pulse signal W. The output nozzle 53a is connected to the control nozzle 51c of the monostable fluid amplifier device 49c through a suitable restriction $R_4$. The output nozzle 53b is connected to the control nozzle 52c through a suitable restriction $R_5$, a delay device 57 and a suitable restriction $R_6$, and the input nozzle 50c is connected to the air reservoir 30 through a suitable restriction $R_7$. Said delay device 57 may be of any suitable form, such a fluid capacitor or elongated passage, and serves to convert the air signal $W_1$ into a delayed air signal $W_1'$ delayed by a relatively short time, of milli-second order. Therefore, the shaped air pulse signal $W_1$ enters the control nozzle 51c, and the shaped delayed air pulse signal $W_1'$ enters the control nozzle 52c. Consequently, from the output nozzle 53c there is derived an air signal $W_2$ which has the same frequency as that of the air pulse signal W and which has uniform pulse width corresponding to the time difference between the two signals $W_1$ and $W_1'$, and which is independent of the frequency of those signals. On the other hand, from the output nozzle 54c is derived an air signal $W_3$ which has an inverted wave form with respect to the signal $W_2$. The output nozzles 53c and 54c are connected through suitable restrictions $R_8$ and $R_9$ to integrators 58 and 59, respectively, which have enlarged air chambers and which serve to convert digital air signals $W_2$ and $W_3$ into analogue air signals. Thus, an analogue signal whose pressure is proportional to the pulse frequency of the air signal $W_2$, namely, wheel rotational speed, is generated from the integrator 58, and another analogue signal whose pressure is indirectly proportional to wheel rotational speed is generated from the integrator 59.

Reference numerals 60a, 60b and 60c designate proportional fluid amplifiers, or analogue amplifiers, which have input nozzles 61a, 61b and 61c, pairs of control nozzles 62a–63a, 62b–63b, and 62c–63c, pairs of output nozzles 64a–65a, 64b–65b, 64c–65c, and pairs of vent nozzles 66a–67a, 66b–67b and 66c–67c. The general mode of operation of the fluid amplifiers above numerated may be described by taking that of the fluid amplifiers 60a as an example.

When pressures in the two control nozzles 62a and 63a are equal, the air signal from the input nozzle 61a is equally divided and equal components are admitted into the output nozzles 64a and 65a. On the other hand, when the pressure in the control nozzle 62a is higher than that in the control nozzle 63a, more of the air signal from the input nozzle 61a flows into output nozzle 64a and less flows into the output nozzle 65a in proportion to the pressure difference between control nozzle 62a and 63a, and vice versa. Each fluid amplifier may be similar to any conventional jet beam deflection proportional amplifier. The input nozzle 61a of the fluid amplifier 60a is connected to the air reservoir 30 through a suitable restriction $R_{10}$, and the control nozzles 62a and 63a are connected to the integrators 58 and 59 through suitable restrictions $R_{11}$ and $R_{12}$, respectively. Therefore, the output nozzle 64a receives a further amplified air signal which is in proportion to wheel speed, since the air signals from the control nozzles 62a and 63a are in inverse proportional relationship.

Numeral 68 designates a differential fluid amplifier device comprising a first supply nozzle 71 which projects into a chamber 70 in a main body 69, a second supply nozzle 73 which projects into a space 72 formed in the main body 69 communicating with atmosphere, the nozzle 73 being in axial registry with and facing the first supply nozzle 71. A shielding plate 74 is mounted between the supply nozzles 71 and 73 and has a small aperture 74a in axial registry with the supply nozzles 71 and 73. Chamber 70 is provided with an output nozzle 75. The main body 69 is further provided with an air chamber 76 communicating with the inner end of the supply nozzle 73. Main body 69 is also provided with an intake port 71a connected at one end to the output nozzle 64a of the fluid amplifier 60a and communicating at its other end with the first supply nozzle 71. The body 69 is further provided with an intake port 73a connected at its outer end to the output nozzle 64a of the fluid amplifier 60a and communicating at its inner end with the air chamber 76. Thus, when the air signal proportional to wheel speed is supplied from the output nozzle 64a of the fluid amplifier 60a to the intake ports 71a and 73a, the air signal from the intake port 73a is delayed for a very short period of time, of the order of a microsecond, by the air chamber 76. The air signal from the supply nozzle 71, supplied through the port 71a, and the delayed air signal from the supply nozzle 73, furnished through the air chamber 76, impinge on each other, so that a resultant air signal is derived in the chamber 70 which is in accordance with the pressure difference therebetween. In the case wherein the vehicle is decelerating during braking, the pressure of the delayed air signal from the nozzle 73 is higher than that of the air signal from the supply nozzle 71 because of the time delay, so that the pressure of the resultant air signal in the chamber 70 is in proportion to the wheel deceleration of the vehicle. Thus the pressure of the resultant air signal from the output nozzle 75 furnished from the chamber 70 is also in proportion to the pressure levels of the air signals from the supply nozzles 71 and 73, that is, wheel speed at that moment. The fluid amplifier 60b is enabled to obtain the net pressure reducing ratio without being influenced by the wheel speed of the vehicle. The input nozzle 61b of fluid amplifier 60b is connected to the air reservoir 30 through a suitable restriction $R_{14}$, the control nozzle 62b of amplifier 60b is connected to the output nozzle 75, and the control nozzle 63b of fluid amplifier 60b is connected to the output nozzle 64a of fluid amplifier 60a through a suitable restriction $R_{13}$. Therefore, the output nozzle 64b receives an air signal D having a pressure in proportion to the net pressure-reducing ratio, since the air signal portion from the control nozzle 62b influenced by wheel speed is offset by that from the control nozzle 63b.

As above mentioned, wheel deceleration operational circuit 26 comprises the monostable fluid amplifier devices 49a, 49b, 49c, the fluid amplifiers 60a, 60b, and the differential fluid amplifier device 68.

Reference numeral 77 designates a bias fluid amplifier which constitutes a comparator circuit 27 and which is substantially similar in characteristics and structure to the fluid amplifier 60a. The bias fluid amplifier 77 is also provided with an input nozzle 78 connected to the air reservoir 30 through a suitable restriction $R_{15}$, a pair of control nozzles 79 and 80 connected to the output nozzle 64b of the fluid amplifier 60b and the supply nozzle 48 of the brake torque sensor 23, respectively, a pair of output nozzles 82 and 83, and a pair of vent nozzles 84 and 85, and differs from the fluid amplifier 60a in that a bias nozzle 81, connected to air reservoir 30 through a suitable restriction $R_{16}$, is provided adjacent to the control nozzle 80 for furnishing a predetermined biasing pressure.

When the generated brake torque is in proportion to wheel deceleration, the air signals in the control nozzles 79 and 80 are set to be of equal pressure by the suitable flow restriction $R_{17}$, and therefore the output nozzle 82 receives no air signal by the action of the biasing pressure from the bias nozzle 81. However, when the proportional relationship between brake torque and wheel deceleration is no longer present, the output nozzle 82 receives an air signal P proportional to the pressure difference between the fluid in the control nozzles 79 and 80.

Reference numeral 60c designates the fluid amplifier constituting the amplifier circuit 28. The input nozzle 61c is connected to the air reservoir 30 through a suitable flow restriction $R_{18}$. The control nozzles 62c and 63c are connected to the output nozzles 83 and 82 of the bias fluid amplifier 77, respectively. Therefore, when the proportional relationship between brake torque and wheel deceleration is no longer present, the output nozzle 65c receives an amplified air signal in accordance with the pressure difference between the fluid pressures in the control nozzles 62c and 63c.

Next, the servo valve 29 will be described in detail with reference to FIG. 10. A relatively large diameter exhaust chamber 87 is formed at the bottom of a valve housing 86. A reduced recess 88 is provided centrally of the exhaust chamber 87, extending upwardly as viewed in FIG. 10. A further reduced output chamber 89 is provided centrally and extends upwardly from recess 88. A valve seat member 90 having a supply valve chamber 91 therein, is secured on the top end of the valve housing 86. A valve passage 92 which communicatively connects the valve chamber 91 with the output chamber 89 is provided at the bottom of the valve seat member 90. Reference numeral 93 designates a valve body which has a first cone-shaped valve element 94 on its middle portion and a second spherical valve element 95 at its bottom end. The valve body or stem 93 is located in the supply valve chamber 91, and its first valve element 94 normally shuts off the valve passage 92, and its second valve element 95 projects into the output chamber 89. A coil compression spring 97 surrounds stem 93 and is located between the upper side of the first valve element 94 and a cap body 96 mounted in the top end of the valve seat 90. Said compressive spring 97 serves to bias the valve body 93 downwardly to cause the first valve element 94 to normally shut off the communication between the supply chamber 91 and the output chamber 89.

A relatively large-diameter diaphragm 100 is secured between the bottom of the valve housing 86 and an end plate 98, which has a relatively large-diameter input chamber 99, the diaphragm 100 acting so as to separate the exhaust chamber 87 from the input chamber 99. Reference numeral 101 designates a relatively small-diameter diaphragm which is secured between the top wall of the recess 88 and a rigid annular plate 102, and which separates the exhaust chamber 87 from the output chamber 89. Reference numeral 103 designates a valve seat body which is sealingly secured between diaphragms 100 and 101, whose upper end projects into the output chamber 89. An exhaust passage 104 is formed in the valve seat body 103 to communicatively connect the output chamber 89 with the exhaust chamber 87. However, communication therebetween is normally shut off by the engagement of the second valve element 95 on the upper valve seat of the valve seat body 103, under the restitution force exerted by the diaphragms 100 and 101. A supply port 105, connected to the air reservoir 30 through a suitable restriction $R_{20}$, is provided in the wall of the supply valve chamber 91, an output port 106, connected to the pressure modulating valve 24, is provided in the wall of the output chamber 89, an exhaust port 107, connected to atmosphere, is provided in the top wall of the exhaust chamber 87, and an input port 108, connected to the output nozzle 65c of the fluid amplifier 60c, is provided in the bottom wall of the input chamber 99, as shown in FIG. 10.

Therefore, when the air signal is sent from the output nozzle 65c of the fluid amplifier 60c to the input chamber 99 through the input port 108, the pressure in the input chamber 99 rises and the diaphragm 100 is pushed upwardly, causing the valve body 93 to be pushed upwardly by the action of the valve seat body 103 against element 95 and against the force of the biasing spring 97. Consequently, the first valve element 94 is disengaged from the valve seat of the valve passage 92, so that the valve chamber 91 is placed in communication with the output chamber 89. Thus, compressed air is supplied from the air reservoir 30 to the output chamber 89 through the supply port 105 and the supply valve chamber 91, so that an air signal is provided at the output port 106 which is in proportion to the input air signal from the input port 108, but which is further pressurized. If the flow of said input air signal into the input chamber 99 ceases, the pressure in input chamber 99 is reduced and diaphragm 100 resumes its normal position shown in FIG. 10.

The valve body 93 is pushed down by the force of the spring 97 and the first valve element 94 contacts with the valve seat of the valve passage 92 to shut off the connection between the supply valve chamber 91 and the output chamber 89. In this case, when the pressure in the output chamber 89 is still high under the influence of the pressure modulating valve 24, which is connected to the output port 106, the diaphragm 101 is forced downwardly and the valve seat body 103 is moved downwardly. Under these conditions the valve seat of the valve seat body 103 is disengaged from the connecting valve element 95, whereby to connect the output chamber 89 with the exhaust chamber 87, so that the pressure in the output chamber 89 decreases. As a result of this pressure drop, the diaphragm 101 resumes its normal position, shown in FIG. 10, and the valve seat of the valve seat body 103 sealingly engages with the second valve element 95, which causes the communication between the output chamber 89 and the exhaust chamber 87 to be cut off.

Referring to FIG. 11, the pressure modulating valve 24 will now be described in detail. A stepped bore 110, which has a larger diameter bore portion 111 and a smaller diameter bore portion 112, is formed in a valve housing 109. A larger diameter portion 114 of a stepped piston 113 and a smaller diameter portion 115 of said stepped piston are respectively slidably engaged in the larger bore portion 111 and the smaller bore portion 112 of the stepped bore 110. A supply chamber 116 is formed in the valve housing 109 and is located adjacent to the larger bore portion 111, the diameter of said chamber 116 being larger than that of said larger bore portion 111. One end of the larger portion 114 of the stepped piston 113 projects into the supply chamber 116. The end wall 129 of an air chamber housing 117 is secured to the rim of the valve housing 109. A projecting portion 118 of the end wall 129 projects into the supply chamber 116 to limit the leftward movement of the stepped piston 113, as viewed in FIG. 11. Moreover an output chamber 119 is formed in the valve housing 109 located adjacent to the smaller bore portion 112, the diameter of said output chamber 119 being larger than the diameter of said smaller bore portion 112. The opening side of the smaller bore portion 112 is sealed by a sealing bushing assembly 120. A coil compression spring 121 is located between the sealing plug member 120 and the end of the smaller portion 115 of the stepped piston 113 to urge the stepped piston 113 against the projecting portion 118. An annular groove 122 is formed between the larger bore portion 111 and the smaller bore portion 112 of the stepped bore 110, and is communicatively connected to atmosphere through a vent port 123 so as to prevent a pressure rise in groove 122 upon rightward movement of the stepped piston 113. Moreover, upon rightward movement of the stepped piston 113, the stepped portion of the larger piston element 114 is engaged with the shoulder of the annular groove 122 to limit the rightward movement of said stepped piston 113. A longitudinally extending passage 124 is drilled in the stepped piston 113 and communicates at one end with a radial passage 124a opening into the supply chamber 116. The other end of the passage 124 opens into the output chamber 119. Therefore, when the stepped piston 113 is located at the leftward end of its stroke, the supply chamber 116 and the output chamber 119 are in communication, whereas when the stepped piston 113 is moved to the right, so that the passage 124a is closed by the wall of the larger bore portion 111, communication between the supply chamber 116 and the output chamber 119 is shut off.

The stepped piston 113 is axially formed with a cylindrical bore 125 in which a piston 126 is slidably engaged. Piston 126 is integrally formed with piston rods 127 and 128 extending axially therefrom on opposite sides thereof. Piston rod 127 extends slidably and sealingly through wall 129 of the air chamber housing 117 and extends into the air chamber 130 of the air chamber housing 117, whereas the piston rod element 128 extends slidably and sealingly through a bushing member 120 and projects outwardly into the atmosphere. A recess 131 is centrally bored in the projecting portion 118 of wall member 129 of air chamber housing 117 and is communicatively connected by a passage 132 with the supply chamber 116. The piston 126 is biased toward its neutral position, shown in FIG. 11, by means of the coiled compression springs 133 and 134 surrounding the respective piston rod elements 127 and 128, and being respectively located between the bottom of recess 131 and piston 126 and between the bushing element 120 and the piston 126. The mid portion of a flexible diaphragm 137 is clampingly secured between two cup-shaped rigid members 135 and 136 clampingly secured to the end of the piston rod element 127, and the peripheral portion of said diaphragm is clampingly secured between the rim flange of a cup-shaped cover body 138 and the rim flange of the air chamber housing 117, so that the air chamber 130 is sealed with respect to the atmosphere. The space inside the cover member 138 adjacent to the diaphragm, shown at 139, is communicatively connected to atmosphere through a vent passage 140.

A supply port 141 connected to the master cylinder 13 by the conduit 15, is provided in the wall of the supply chamber 116, an outlet port 142, connected to the wheel cylinder 18 by the conduit 17, is provided in the output chamber 119, and an input port 143, connected to the output port 106 of the servo valve 29, is provided in the air chamber 130.

When the brake pedal 11 is depressed and fluid under pressure is supplied from the master cylinder 13 to the supply port 141, the fluid under pressure is directed to the wheel cylinder 18 through the supply chamber 116, the passages 124 and 124a, the output chamber 119, the output port 142, and the conduit 17, whereby to extend the brake shoes 19 and 20 outwardly. When the shoes 19 and 20 are extended outwardly and pressed against the brake drum 22, and the pressure in the supply chamber 116 and in the output chamber 119 become higher than a predetermined value, a thrust force in accordance with the differential in area between the larger portion 114 and the smaller portion of the stepped piston 113 becomes greater than the force of the compression spring 121, causing the stepped piston 113 to be moved to the right, and causing the wall of the larger portion 111 to seal off the passage 124a. Thus, the fluid under pressure is sealed in the output chamber 119, the conduit 17 and the wheel brake cylinder 18. Under these conditions the fluid under pressure in the supply chamber 116 acts on the left end of the piston 126, passing through the passage 132, the recess 131 and the cylindrical bore 125, while the fluid under pressure sealed up in the output chamber 119 acts on the right end of the piston 126. Under these conditions, if the air signal V flows into the air chamber 130 from the output port 106 of the servo valve 129, the pressure in the air chamber 130 rises, and therefore the diaphragm 137 and piston 126 are moved to the left as a unit. This causes the pressure in the output chamber 119 and the wheel brake cylinder 18 to be decreased. On the other hand, when the air signal V is no longer admitted into the air chamber 130, the pressure in the output chamber 119 will again rise because of the rightward movement of the diaphragm 137 and the piston 126 caused by the fluid under pressure acting against the left end of piston 126.

As described above, when the pedal 11 is forcefully depressed against the resistance of the compression spring 12 while the vehicle is running, fluid under pressure is supplied from the master cylinder 13 to the wheel brake cylinder 18 through the pressure modulating valve 24. Thus, the shoes 19 and 20 are extended outwardly to be brought into frictional contact with the brake drum 22 through the brake linings 21,21. Consequently, brake torque is exerted on the wheel 33 which results in a decrease in wheel speed. In this case, after pressure in the wheel brake cylinder 18 becomes higher than a predetermined value, communication between the master cylinder 13 and the wheel cylinder 18 is shut off by means of the pressure modulating valve 24. Meanwhile, an air signal B is derived from the brake torque sensor 23 whose pressure is in proportion to brake torque, and said signal B is furnished to the comparator circuit 27. Concurrently, the air pulse signal W is derived from the wheel speed sensor assembly 25, the frequency of said pulse signal W being proportional to wheel speed, decreasing momentarily, and being delivered to the wheel deceleration operational circuit 26. The air pulse signal W is differentiated in the wheel deceleration operational circuit 26 and is converted into the air signal V whose pressure is in proportion to the wheel deceleration. The air signal V is then sent to the comparator circuit 27 to be compared with the air signal B whose pressure is in proportion to brake torque.

While wheel deceleration increases in proportion to increase in brake torque, air signals D and B are also proportionally related, so that the air signal P is not at this time derived from the comparator circuit 27. However, in accordance with increase in brake torque, the slip ratio between the tire and the road is gradually increased, and when the frictional coefficient between the tire and the roadway passes its maximum value and starts to decrease, wheel deceleration is increased considerably in comparison with the increase in brake torque. In other words, the normal proportional relationship between brake torque and wheel deceleration is no longer present, and under these conditions the air signal P, whose pressure is in proportion to the pressure difference between the air signals D and B, is derived from the comparator circuit 27. Said air signal P is amplified in the amplifier circuit 28 and delivered to the input chamber 99 of the servo valve 29.

As said amplified air signal acts on the diaphragm 100 to disengage the first valve element 94 from the valve seat of the valve passage 92, the compressed air sent from the reservoir 30 flows into the output chamber 89 through the supply chamber 91, so that the air signal V is supplied to the air chamber 130 of the pressure modulating valve 24.

The admission of the air signal V into the air chamber 130 causes the piston 126 to move to the left, so that the pressure in the wheel brake cylinder 18 is decreased. Therefore, brake torque is decreased and thus wheel speed is increased. When wheel speed is increased, the air signal P is no longer derived from the comparator circuit 27, and thus the air signal will no longer be sent to the servo valve 29. When this occurs the compressed air in the air chamber 130 of the pressure modulating valve 24 acts to force down the diaphragm 101 of the servo valve 29, and the valve seat body 103 is also forced down so as to disengage the valve seat of the valve seat body 103 from the second valve element 95. Consequently, the output chamber 89 is communicatively connected to atmosphere through the exhaust chamber 87, and thus the pressure in the air chamber 130 drops linearly. When the pressure in the air chamber 130 drops, the thrust force, which acts on the piston 126 to provide the reduction in pressure in the wheel brake cylinder 18, is removed, and the pressure in the wheel brake cylinder 18 is again increased, whereby brake torque is increased approximately linearly. In the manner above described, when the proportional relationship between brake torque and wheel deceleration again becomes absent, the pressure in the wheel brake cylinder 18 is decreased as above described. By this procedure, as the communication between the master cylinder 13 and the wheel brake cylinder 18 is interrupted, the pressure in the wheel brake cylinder 18 drops in exact proportion to the pressure of the air signal P. With the repetition of the above-described cycle of events, the vehicle can be quickly stopped.

Referring to FIG. 12, another embodiment of the brake torque sensor assembly will now be described. In FIG. 12, a basic embodiment of the device common to the preceding embodiment is shown with respective reference numerals similar to those used in FIG. 8, and the description of the parts associated with said reference numerals will be omitted. Numeral 144 designates a cylinder which is pivotally connected to backing plate 41 by the anchor pin 45. One end portion of piston 145 is slidably engaged in cylinder 144 and the other end thereof is pivotally connected to the shoe 20. A screw 146 is threadedly engaged through the wall of cylinder 144 and has a reduced tip slidably engaged in a longitudinal recess 162 formed in the surface of the piston 145 to prevent the piston 145 from being disengaged from the cylinder 144. A coil compression spring 147 is seated between one one of piston 145 and the bottom end of the cylinder 144 to bias the piston 145 outwardly from the cylinder 144. The central port 159 is drilled in the end wall of the cylinder 144. Reference numeral 148 generally designates a hydraulic-pneumatic converter. A diaphragm 153 is clamped between a main body 149, in which an air chamber 150 is provided, and a cap body 152, in which an oil chamber 151 is provided, the diaphragm serving to separate the air chamber 150 from the oil chamber 151. A rod-like valve element 154 is axially disposed in the air chamber 150 and the lower end portion of the body 154 extends sealingly and slidably through a central aperture in the bottom of main body 149 and projects into the atmosphere. A coil compression spring 156 surrounds the rod-like valve body 154 and is located between a flange 155 on the top end of body 154 and the bottom wall of air chamber 150 to urge valve body 154 upwardly against the diaphragm 153. A supply nozzle 157 is mounted in axial alignment with and just below the bottom end of the valve body 154, and is connected to the air reservoir 30 and to the input nozzle 80 of the biased fluid amplifier 77 in the same manner as is the supply nozzle 48 shown in FIG. 8. A port 158 is provided in the wall of the oil chamber 151 of the cap body 152 and is connected to the port 159 of the cylinder 144. Reference 160 designates an oil reservoir connected through a check valve 161 to the port 159 of the cylinder 144 to replenish the hydraulic fluid to the cylinder 144.

Therefore, if brake torque is generated and the pressure in the cylinder 144 rises, the diaphragm 153 flexes downwardly, and thus the valve body 154 is moved downwardly. This decreases the clearance between the bottom end of valve body 154 and the adjacent open end of supply nozzle 157, so that the pressure in the supply nozzle 157 is increased in proportion to brake torque. Utilizing such a means, brake torque may be sensed as an air signal.

For another embodiment, it is possible to sense brake torque by utilizing the torsion of the axle housing 40, namely, utilizing the variation of the back pressure in an air nozzle located between the rigid portion of the axle housing and the torsional portion.

It is not always necessary to employ fluid amplifier devices to control the anti-skid braking system according to the present invention. An electrical system may be optionally utilized for operating the wheel deceleration operational circuit, the comparator circuit, and the amplifier circuit in a conventional manner. Moreover, for sensing brake torque, an electrical strain gage secured on a member such as the axle housing may be utilized.

While the invention has been described by means a specific embodiment, it should be understood that the novel characteristics of the invention may be incorporated in other structural forms without departing from the spirit and scope of the invention as defined in the following claims.

What is claimed is:

1. An anti-skid braking system for vehicles comprising wheel rotation sensing means for sensing and deriving a signal proportional to wheel rotation, wheel deceleration operating means connected to said wheel rotation sensing means and including means for converting said signal from said wheel rotation sensing means into a signal proportional to wheel rotating speed and additional means for converting said signal proportional to wheel rotating speed into a signal proportional to wheel deceleration, brake torque sensing means for deriving a signal proportional to brake torque, comparing means connected to said wheel deceleration operating means and said brake torque sensing means for comparing said signal proportional to wheel deceleration with said signal proportional to brake torque to derive a signal proportional to the difference between said proportional signals when the proportional relationship between brake torque and wheel deceleration is absent, and a modulating means connected to said comparing means for modulating the brake torque according to said signal from said comparing means.

2. An anti-skid braking system for vehicles as recited in claim 1, including a master cylinder and a wheel cylinder, wherein said modulating means is connected between the master cylinder and the wheel cylinder for shutting off the connection between said master cylinder and said wheel cylinder when the pressure in said wheel cylinder exceeds a predetermined value, and wherein said modulating means is connected to said comparing means for modulating the pressure in said wheel cylinder in accordance with said signal from said comparing means.

3. An anti-skid braking system for vehicles as set forth in claim 1, wherein said wheel rotation sensing means comprises a rotatable member responsive to wheel rotating speed, a rotating disc with equally spaced rectangular notches on its periphery secured on the periphery of said rotatable member, and sensing means having supply means and receiver means which are secured on a fixed member adjacent to and located on opposite sides of said disc for sensing the rotational rate of said rotating disc.

4. An anti-skid braking system for vehicles as set forth in claim 3, wherein said supply means is a supply nozzle and said receiver means is a receiver nozzle said supply nozzle being connected to a constant-pressure compressed air source for discharging compressed air from the supply nozzle, said compressed air from the supply nozzle being intermittently interrupted by said notched rotating disc.

5. An anti-skid braking system for vehicles as set forth in claim 1, wherein said brake torque sensing means comprises flexible means flexing in response, to brake torque, and a supply nozzle connected to a compressed air source and discharging compressed air, said supply nozzle opening adjacent said flexible means with clearance, said clearance being decreased when brake torque is generated.

6. An anti-skid braking system for vehicles as set forth in claim 1, including a fluid pressure source, wherein said brake torque sensing means comprises a cylinder, a piston slidably mounted in said cylinder and connected to a brake friction element, a flexible member located in the bottom of said cylinder, and a supply nozzle connected to the pressure source and discharging compressed air, said supply nozzle being disposed at the bottom of said cylinder and opening adjacent to said flexible member with clearance, whereby said clearance between said supply nozzle and said flexible member is decreased when brake torque acts on said piston.

7. An anti-skid braking system for vehicles as set forth in claim 1, including a brake assembly having a movable brake friction element and a fixed portion, wherein said brake torque sensing means comprises a cylinder, a piston slidably mounted in said cylinder, means connecting said piston and cylinder between the brake friction element and the fixed portion of the brake assembly, said cylinder having a port connected to an oil reservoir and located in its bottom end portion, and converting means connecting to said port for converting the pressure change in said cylinder caused by brake torque into a signal.

8. An anti-skid braking system for vehicles as set forth in claim 7, wherein said converting means comprises an air chamber, an oil chamber connected to said cylinder of said brake torque sensing means, means including a diaphragm for separating said air chamber from said oil chamber, a valve body resiliently engaging said diaphgram, a compressed air source, and a supply nozzle connected to the compressed air source, said supply nozzle being aligned with and opening adjacent to said valve body, said diaphragm being flexed responsive to pressure change in said cylinder, said pressure change acting on the diaphragm to reduce the clearance between said valve body and said supply nozzle, whereby said pressure change in said cylinder is converted into an air pressure change.

9. An anti-skid braking system for vehicles as set forth in claim 1, wherein said wheel deceleration operating means comprises a digital analogue converting means connected to said wheel rotation sensing means for converting a pulse signal from said wheel rotating speed sensing means into an analogue signal, and differentiating means connected to said digital-analogue converting means for differentiating said analogue signal from said digital-analogue converting means, whereby said signal from said wheel rotation sensing means is converted into a signal proportional to wheel deceleration.

10. An anti-skid braking system for vehicles as set forth in claim 1, wherein said wheel deceleration operating means comprises first means connected to said wheel rotation sensing means for shaping a pulse signal from said wheel rotation sensing means into a rectangular wave form, second means connected to said wheel rotation sensing means for shaping a pulse signal from said wheel rotation sensing means into a rectangular wave form, third means connected to said second means for delaying the pulse signal from said second means for a short time period, fourth means connected to said first means and to said third means for deriving two pulse signals having the same frequency as that of said signal from said wheel rotation sensing means, a first pulse signal from said fourth means having uniform pulse width which corresponds to the time difference between said signals from said first means and said third means irrespective of the frequency of said pulse signal from said first means and said third means, and the second pulse signal from said fourth means being in inverted wave form relative to said first pulse signal from said fourth means, fifth means connected to said fourth means for converting said second pulse signal from said fourth means into an analogue signal, sixth means connected to said fourth means for converting said first pulse signal from said fourth means into an analogue signal, seventh means connected to said fifth means and to said sixth means, and eighth means connected to said seventh means for differentiating said amplified analogue signals from said seventh means.

11. An anti-skid braking system for vehicles as set forth in claim 1, wherein said wheel deceleration operating means includes fluid amplifier devices.

12. An anti-skid braking system for vehicles as set forth in claim 11, wherein said fluid amplifier devices comprise digital-analogue converting means connected to said wheel rotation sensing means for converting the pulse signals from said wheel rotation sensing means into an analogue signal proportional to wheel rotating speed, and differentiating means connected to said digital-analogue converting means for differentiating said analogue signal from said digital-analogue converting means, whereby said pulse signal from said wheel rotation sensing means is converted into a signal proportional to wheel deceleration.

13. An anti-skid braking system for vehicles as set forth in claim 11, wherein said fluid amplifier devices comprise shaping means connected to said wheel rotation sensing means and to the pressure source for shaping the pulse signal from said wheel rotation sensing means into a rectangular wave signal, digital-analogue converting means connected to said shaping means for converting said signal from said shaping means into an analogue signal, and differentiating means connected to said digital-analogue converting means for differentiating said analogue signal from said digital-analogue converting means to derive a signal proportion to wheel deceleration.

14. An anti-skid braking system for vehicles as set forth in claim 11, including a fluid pressure source, wherein said fluid amplifier devices comprise shaping means connected to said wheel rotation sensing means and to the pressure source for shaping the pulse signal from said wheel rotation sensing means into a rectangular wave signal, digital-analogue converting means connected to said shaping means for converting said signal from said shaping means into an analogue signal, amplifying means connected to said digital-analogue converting means and the pressure source for amplifying said signal from said digital-analogue converting means, and differentiating means connected to said amplifying means for differentiating said signal from said amplifying means to derive a signal proportional to wheel deceleration.

15. An anti-skid braking system for vehicles as set forth in claim 14, and second amplifying means connected to said differentiating means and the pressure source for amplifying said signal from said differentiating means.

16. An anti-skid braking system for vehicles as set forth in claim 11, including a fluid pressure source, wherein said fluid amplifier devices comprise first shaping means connected to said wheel rotation sensing means and to the pressure source for shaping the pulse signal from said wheel rotation sensing means into a rectangular wave-form signal, second shaping means connected to said wheel rotation sensing means and to the pressure source for shaping the pulse signal from said wheel rotation sensing means into a rectangular wave-form signal, delaying means connected to said second shaping means for delaying said signal from said second shaping means for a short time period, signal-deriving means connected to said first shaping means and said delaying means and to the pressure source for deriving two pulse signals having the same frequency as said signal from said wheel rotation sensing means, said two pulse signals comprising a first pulse signal having uniform pulse width which corresponds to the time difference between said signal from said first shaping means and that from said delaying means irrespective of the frequency of said pulse signals from said first shaping means and from said delaying means, and a second pulse signal in inverted wave form relative to said first pulse signal from said pulse-deriving means, first digital-analog converting means connected to said signal-deriving means for converting said second pulse signal from said signal-deriving means into an analogue signal, second digital-analogue converting means connected to said signal-deriving means for converting said first pulse signal from said signal-deriving means into an analogue signal, amplifying means connected to said first digital-analogue converting means and said second digital-analogue converting means and to the pressure source for amplifying the analogue signals from said first digital-analogue converting means and from said second digital-analogue converting means, and differentiating means connected to said amplifying means for differentiating said signal from said amplifying means.

17. An anti-skid braking system for vehicles as set forth in claim 11, wherein said comparing means is a fluid amplifier device.

18. An anti-skid braking system for vehicles as set forth in claim 17, including in addition thereto, an amplifier circuit connected between said comparing means and said modulating means for amplifying said signal from said comparing means including a proportional fluid amplifier.

19. An anti-skid braking system for vehicles as set forth in claim 11, including a pressure fluid source, wherein said fluid amplifier devices comprise first means connected to said wheel rotation sensing means and to the pressure source for shaping pulse signals from said wheel rotation sensing means into a rectangular wave-form signal, second means connected to said wheel rotation sensing means and to the pressure source for shaping pulse signals from said wheel rotation sensing means into a rectangular wave-form signal, third means connected to said second means for delaying said shaped pulse signal from said second means for a short time period, fourth means connected to said first means and said third means and to the pressure source for deriving two pulse signals having the same frequency as that of said signal from said wheel rotation sensing means, the first pulse signal from said fourth means having uniform pulse width which corresponds to the time difference between said signals from said first means and said third means irrespective of the frequency of said pulse signals from said first means and said third means, the second pulse signal from said fourth means being in inverted wave form relative to said first pulse signal from said fourth means, fifth means connected to said fourth means for converting said second pulse signal from said fourth means into an analogue signal, sixth means connected to said fourth means for converting said first pulse signal from said fourth means into an analogue signal, seventh means connected to said fifth means and said sixth means and to the pressure source for amplifying said analogue signals from said fifth means and said sixth means, eighth means connected to said seventh means for differentiating said analogue signal from said seventh means, and ninth means connected to said eighth means and to the pressure source for amplifying said signal from said eighth means.

20. An anti-skid braking system for vehicles as set forth in claim 19, wherein said first means is a monostable fluid amplifier device.

21. An anti-skid braking system for vehicles as set forth in claim 19, wherein said second means is a monostable fluid amplifier device.

22. An anti-skid braking system for vehicles as set forth in claim 19, wherein said third means is a delay device having a delay line.

23. An anti-skid braking system for vehicles as set forth in claim 19, wherein said fourth means is a monostable fluid amplifier device.

24. An anti-skid braking device for vehicles as set forth in claim 19, wherein said fifth means is a digital-analogue converter.

25. An anti-skid braking system for vehicles as set forth in 24, wherein said digital-analogue converter is an integrator having an enlarged chamber.

26. An anti-skid braking system for vehicles as set forth in claim 19, wherein said sixth means is a digital-analogue converter.

27. An anti-skid braking system for vehicles as set forth in claim 26, wherein said digital-analogue converter is an integrator having an enlarged chamber.

28. An anti-skid braking system for vehicles as set forth in claim 19, wherein said seventh means is a proportional amplifier.

29. An anti-skid braking system for vehicles as set forth in claim 19, wherein said eighth means comprises a first supply nozzle projecting into a chamber having an output nozzle, a second supply nozzle projecting into a space connected to atmosphere and registering with said first supply nozzle, a shielding plate located between said two supply nozzles and having an aperture registering with said nozzles, said space communicating with said chamber through said aperture, intake ports connected to said supply nozzles and also to the common fluid signal source, and means defining an air chamber between one intake port and said first supply nozzle for delaying the input signal from said one intake port.

30. An anti-skid braking system for vehicles as set forth in claim 19, wherein said ninth means is a proportional amplifier.

31. An anti-skid braking system for vehicles as set forth in claim 1, including in addition thereto, a pressure source, a servo valve for amplifying said signal from said comparing means, said servo valve comprising a valve housing having a supply chamber connected to said pressure source and an output chamber connected to said supply chamber through a supply passage provided therein and to said modulating means, gate means located between said supply chamber and said output chamber for usually shutting off said supply passage, and releasing means connected to said comparing means for releasing said gate means in accordance with said signal from said comparing means, whereby said supply chamber and said output chamber are placed in communication.

32. An anti-skid braking system for vehicles as set forth in claim 31, wherein said gate means includes a valve body having a first valve element and a second valve element thereon, and said releasing means comprises an exhaust chamber communicatively connected to said output chamber through an exhaust passage and to atmosphere, an input chamber connected to said comparing means, a pair of diaphragms, one of said diaphragms separating said output chamber from said exhaust chamber, the other of said diaphragms separating said exhaust chamber from said input chamber, and a valve seat body secured between said diaphragms and having said exhaust passage therein, said second valve element being sealingly engagable in the end of said exhaust passage, said first valve element being sealingly and resiliently engagable in said supply passage, said second valve element shutting off said exhaust passage by the action of said diaphragms, whereby the communications between said supply chamber and said output chamber and between said output chamber and said exhaust chamber are shut off.

33. An anti-skid braking system for vehicles as set forth in claim 1, including a master cylinder and a wheel cylinder, wherein said modulating means comprises gating means for shutting off the connection between said master cylinder and said wheel cylinder when the pressure in said master cylinder exceeds a predetermined value and pressure modulating means for modulating the pressure in said wheel cylinder in accordance with said signal from said comparing means, said gating means including a valve housing having a cylinder therein connected between said master cylinder and said wheel cylinder, a piston slidably mounted on said cylinder, said piston having a passage therein for communicating said master cylinder and said wheel cylinder, and resilient means mounted in said cylinder for urging said piston in one direction so as to communicate said master cylinder and said wheel cylinder, said pressure modulating means having a second cylinder provided in said piston of said gating means, a second piston slidably mounted in said cylinder and operatively connected to said comparing means.

34. An anti-skid braking system for vehicles as set forth in claim 33, wherein said cylinder of said gating means is formed with a stepped bore and has at the opposite ends of said stepped bore a supply chamber connected to said master cylinder and an output chamber connected to said wheel cylinder, and said piston has different diameter portions thereon respectively slidably fitting the stepped portions of said stepped bore, the largest portion of said piston extending into said supply chamber, said passage being located so that said supply chamber is connected to said output chamber through said passage when said piston is located in said supply chamber, whereby said piston is moved so as to close said passage by the diameter difference of said piston when the pressure is exerted thereon, the pressures in said supply chamber and said output chamber acting on opposite sides of said second piston, and wherein said gating means further comprises a diaphragm connected to a piston rod of said second piston, said diaphragm and said valve housing defining a chamber therebetween connected to said comparing means.

* * * * *